(12) United States Patent
Nylander et al.

(10) Patent No.: US 9,369,343 B2
(45) Date of Patent: Jun. 14, 2016

(54) METHOD AND USER EQUIPMENT FOR COLLECTING CONFIGURATION DATA USEABLE FOR INITIALIZATION OF A RADIO ACCESS NODE

(75) Inventors: Tomas Nylander, Värmdö (SE); Per-Daniel Stålnacke, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/384,180

(22) PCT Filed: Apr. 12, 2012

(86) PCT No.: PCT/SE2012/050400
§ 371 (c)(1),
(2), (4) Date: Sep. 10, 2014

(87) PCT Pub. No.: WO2013/154478
PCT Pub. Date: Oct. 17, 2013

(65) Prior Publication Data
US 2015/0038138 A1    Feb. 5, 2015

(51) Int. Cl.
*H04W 48/16* (2009.01)
*H04W 48/18* (2009.01)
(Continued)

(52) U.S. Cl.
CPC ........ *H04L 41/0853* (2013.01); *H04L 41/0806* (2013.01); *H04L 41/0886* (2013.01); *H04L 41/24* (2013.01); *H04W 24/02* (2013.01); *H04W 88/08* (2013.01)

(58) Field of Classification Search
CPC ..... H04W 48/16; H04W 48/18; H04W 48/20; H04W 88/06; H04W 48/12; H04W 72/02; H04W 24/02; H04W 88/08; H04L 41/0853; H04L 41/0806; H04L 41/0886; H04L 41/24
See application file for complete search history.

(56) References Cited

U.S. PATENT DOCUMENTS

2009/0296641 A1* 12/2009 Bienas et al. ............. 370/329
2011/0150266 A1    6/2011 Hohndel
2012/0178451 A1*  7/2012 Kubota et al. ............ 455/436

FOREIGN PATENT DOCUMENTS

EP        1 947 811       7/2008
WO        WO 02/07467     1/2002
(Continued)

OTHER PUBLICATIONS

International Search Report for International application No. PCT/SE2012/050400, Mar. 27, 2013.
(Continued)

*Primary Examiner* — Ted Wang
(74) *Attorney, Agent, or Firm* — Patent Portfolio Builders, PLLC

(57) ABSTRACT

It is presented a user equipment (20), UE, for collecting configuration data useable for initialization of a radio access node (10). The UE (20) comprises a communication interface (22) arranged for wireless communication, a processor (23) and a memory (24) for storing a software package comprising computer program code. When the software package is run in the processor (23) it causes the user equipment (20) to collect configuration data in form of a Public Land Mobile Network, PLMN, code and scan neighboring radio access nodes associated with the collected PLMN code for collecting configuration data in the form of broad casted System Information, SI, data. The UE (20) establishes a wireless communication link with the radio access node (10) and communicates the collected configuration data to the radio access node (10) over the established wireless communication link. Furthermore a corresponding method, computer programs and computer program products are disclosed.

15 Claims, 2 Drawing Sheets

(51) Int. Cl.
*H04L 12/24* (2006.01)
*H04W 24/02* (2009.01)
*H04W 88/08* (2009.01)

(56) References Cited

FOREIGN PATENT DOCUMENTS

| WO | 2007040454 A2 | 4/2007 |
|---|---|---|
| WO | WO 2010/028702 | 3/2010 |

OTHER PUBLICATIONS

PCT Notification Concerning Transmittal of International Preliminary Report on Patentability (Chapter 1 of the Patent Cooperation Treaty) for International application No. PCT/SE2012/050400, Oct. 14, 2014.

Nortel, "UE assisted localization of home cells," 3GPP TSG-RAN WG 2 meeting #59, R2-073033, XP050603150, Aug. 20-24, 2007, pp. 1-2.

* cited by examiner

METHOD AND USER EQUIPMENT FOR COLLECTING CONFIGURATION DATA USEABLE FOR INITIALIZATION OF A RADIO ACCESS NODE

PRIORITY

This nonprovisional application is a U.S. National Stage Filing under 35 U.S.C. §371 of International Patent Application Serial No. PCT/SE2012/050400, filed Apr. 12, 2012 and entitled "A Method and User Equipment for Collecting Configuration Data Useable for Initialization of a Radio Access Node."

TECHNICAL FIELD

Embodiments of the present invention presented herein generally relate to initialization of radio access nodes. More particularly, embodiments disclosed herein relate to a method for collecting configuration data useable for initialization of a radio access node with the use of a user equipment. Furthermore, embodiments of the present invention are directed to a corresponding user equipment, computer programs and computer program products.

BACKGROUND

When starting up a new radio access node, such as a radio base station or an access point in a Wireless Local Area Network, WLAN, the radio access node is generally not pre-configured with any information. By not pre-configuring the radio access nodes the vendor is released from the administrative burden thereof and also the burden of keeping track of how each radio access node is configured. A non-configured radio access node is also much more useful and may be used anywhere in the radio access network, since it is not limited by its configuration. As a consequence the radio access nodes need to be configured at site before they can operate normally. Therefore, during initialization the radio access nodes generally need to connect to a management server in order to get access to configuration data necessary for subsequent enablement of normal operation of the radio access node. To access this information from the management server, the radio access node must initially be provided with some information about its management server, e.g. the identity of the management server and/or the (location) address of the management server.

The current solution to deal with this is to connect a laptop to the radio access node via a wired connection and manually enter the needed data to the radio access node via the user interface, normally the keypad of the laptop. This is typically done at the site where the radio access node is to be physically located. Since the installation process requires manual input by someone, this is sometimes considered a security risk. Furthermore, manual input by human beings may be error prone. Yet further, this process requires fairly skilled personnel. That is, the personnel may need to have a detailed technical skill, e.g., about the installation process.

Thus, if the configuration is done in factories by the vendors or in delivery centers by either the vendors and/or the operators, it will place an undue administrative and logistic burden on the vendors and/or operators. On the other hand, configuring the radio access notes on site will require skilled and costly personnel. At the same time there is an increase in installations of radio access nodes and especially low output nodes used in heterogeneous networks together with a desire in the industry to keep costs down and/or to increase availability of manpower with as low skill and/or short training as possible.

SUMMARY

In view of the above, an improved process for collecting configuration data would be advantageous and, in particular, a process allowing for a simplified deployment, cost-effectiveness, and/or enhanced security would be advantageous.

It is therefore a general object of embodiments of the present invention to mitigate, alleviate or eliminate one or more of the above-mentioned disadvantages and provide for improved initialization of radio access nodes.

According to a first aspect, a method is provided for collecting configuration data useable for initialization of a radio access node. The method is performed in a user equipment in which a software package is installed and executable in a processor thereof. The user equipment may e.g. be a smart phone, a mobile phone or a cellular phone. The method comprises: collecting configuration data in form of a Public Land Mobile Network, PLMN, code; scanning neighboring radio access nodes associated with the collected PLMN code for collecting configuration data in form of broadcasted System Information, SI, data; establishing a wireless communication link with the radio access node and communicating the collected configuration data to the radio access node over the established wireless communication link. This means that the user equipment can collect configuration data inform of SI data and send it to the radio access node that is being initialized. Thus, the radio access node may be configured by almost anyone having the software package installed in the user equipment and of course is authorized to initialize the radio access node in question. There is no need that the personnel is technical skilled since the whole initialization process is automated, i.e. requires no or very little manual input. The personnel only needs to power up the radio access node and execute the software package installed on the user equipment. All this provides for enhanced security during the initializing of the radio access node, i.e. less personnel induced errors will occur during the initialization process.

In a preferred embodiment, the SI data comprises cell identity; routing and/or tracking area data within the coverage area of the radio access node to be initialized.

In another preferred embodiment the PLMN code is collected by reading the PLMN code from the Subscription Identity Module/Universal Subscription Identity Module, SIM/USIM, of the user equipment. In some embodiments configuration data in form of geographical location data is collected by using the Global Positioning System, GPS.

In preferred embodiments the method further comprises reading an optical representation of data associated with the radio access node, said optical representation of data being an identifier of the radio access node. Furthermore a string of characters based on the read optical representation of data associated with the radio access node may be obtained and an encryption key based on the obtained string of characters may be generated.

According to a second aspect, a user equipment for collecting configuration data useable for initialization of a radio access node is provided. The user equipment comprises a communication interface arranged for wireless communication; a processor; and a memory storing a software package comprising computer program code which, when run in the processor, causes the user equipment to: collect configuration data in form of a PLMN code; scan neighboring radio access nodes associated with the collected PLMN code for collecting configuration in form of broadcasted SI data; establish a wireless communication link with the radio access node and communicate the collected configuration data to the radio access node over the established communication link.

The user equipment according to the second aspect provides for one or more of the earlier-mentioned advantages and/or effects.

In some embodiments of the present invention the user equipment is configured to collect SI data comprising cell identity; routing and/or tracking area data within the coverage area of the radio access node to be initialized.

The user equipment may comprise a reader, such as a barcode reader, arranged to read an optical representation of data associated with the radio access node, said optical representation of data being a unique identifier of the radio access node.

The user equipment may e.g. be a smart phone, a mobile phone or a cellular phone. This means that the personnel performing the collecting of configuration data useable for initialization of the radio access nodes does not have to bring a comparatively larger laptop to the site where the radio access node is to be deployed.

According to a third aspect, a computer program is provided. The computer program is suitable for collecting configuration data useable for initialization of a radio access node. The computer program comprises computer program code which, when run in a processor of the user equipment, causes the user equipment to: collect configuration data in form of a PLMN code; scan neighboring radio access nodes associated with the collected PLMN code for collecting configuration in form of broadcasted SI data; establish a wireless communication link with the radio access node and communicate the collected configuration data to the radio access node over the established communication link.

The computer program may additionally comprise computer program code which, when run in the processor of the user equipment, causes the user equipment to perform any of the methods according to the first aspect.

The computer program according to the third aspect allows for one or more of the earlier-mentioned advantages and/or effects.

According to a fourth aspect, a computer program product is provided. The computer program product comprises a computer program according to the third aspect and a computer readable means on which the computer program is stored.

BRIEF DESCRIPTION OF THE DRAWINGS

These and other aspects, features and advantages of the invention will be apparent and elucidated from the following description of embodiments of the present invention, reference being made to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of invention to those persons skilled in the art. Like numbers refer to like elements throughout the description.

Figure 1:
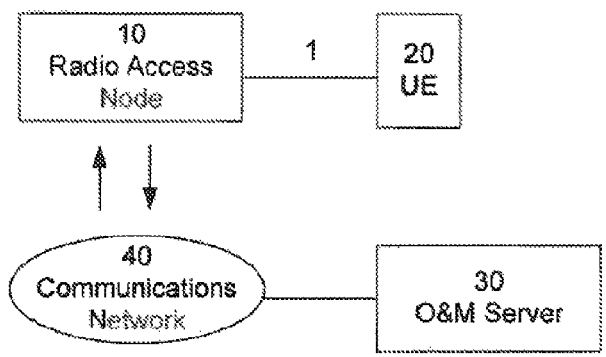
FIG. 1 is a schematic diagram illustrating an exemplary environment where embodiments presented herein can be applied.

FIG. 1 is a schematic diagram illustrating a possible environment where embodiments of the invention described herein can be applied. The diagram illustrates a radio access node 10, a user equipment 20, an Operation and Maintenance, O&M, server 30 and a communications network 40 all of which will be closer described below.

The radio access node 10 may be any node set up for communication via the communications network 40. Radio access nodes may be radio base stations, such as a Base Transceiver Station, BTS for the Global System for Mobile Communications, GSM, a NodeB (NB) for the Universal Mobile Telecommunications System, UMTS, an eNodeB (evolved NodeB, eNB) for Long Term Evolution, LTE, or an access point in a Wireless Local Area Network, WLAN. When the radio access nodes 10 are to be put into operation they need to be initialized and configured before they can operate normally, i.e. to serve traffic to and from user equipments 20 and/or other nodes. This configuration can e.g. include hundreds of parameters. During the initialization and configuration process of the radio access node 10, which will be described closer in conjunction with FIG. 4, the radio access node will be connected to the user equipment 20 in order to obtain its correct configuration data. In context of the present application configuration data should be interpreted in a broad sense and is not only data needed to configure the radio access node 10 itself, but also data that is used in order for the radio access node 10 to connect to the correct management server, such as the O & M server or a Radio Network Controller, RNC.

Figure 2:
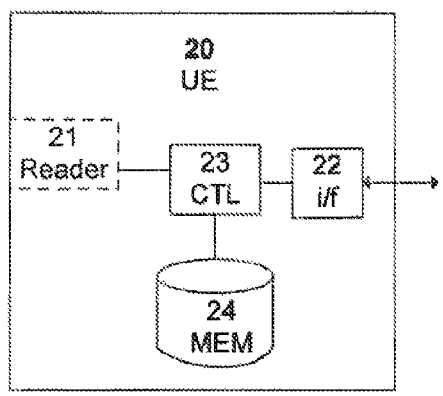
FIG. 2 is a schematic diagram illustrating some modules of an embodiment of a user equipment.

FIG. 2 is a schematic diagram illustrating some modules of an embodiment of a user equipment 20 (hereinafter referred to as UE). The UE 20 is also known as mobile communication terminal, user terminal or mobile terminal. In preferred embodiments, the UE 20 is a smart phone, mobile telephone or a cellular phone. However, it is equally possible that the UE 20 could be a laptop computer, tablet computer or the like. The UE 20 comprises a controller (CTL) or a processor 23 that may be constituted by any suitable Central Processing Unit, CPU, microcontroller, Digital Signal Processor, DSP, etc., capable of executing a computer program comprising computer program code. The computer program may be stored in a memory (MEM) 24. The memory 24 can be any combination of a Read And write Memory, RAM, and a Read Only Memory, ROM. The memory 24 may also comprise persistent storage, which, for example, can be any single one or combination of magnetic memory, optical memory, or solid state memory or even remotely mounted memory. The UE 20 may also comprise a reader 21, which is arranged to read an optical representation of data associated with the radio access node 10. The optical representation of data may be a unique identifier of the radio access node 10. The reader 21 may comprise a camera. In some embodiments, the reader 21 can be implemented as a barcode reader for reading a barcode. Alternatively, the reader 21 could be implemented as NeoReader. A NeoReader is a software application that is accessible for and downloadable to UEs 20 and that allows UEs to be used as a barcode scanner. The UE 20 further comprises a communication interface (i/f) 22 arranged for establishing a communication link 1 with other devices or nodes, such as the radio access node 10. When the above-mentioned computer program code is run in the processor 23 of the UE 20, it causes the UE 20 to collect configuration data in form of the PLMN code, scan neighboring radio access nodes 10 associated with the collected PLMN code for collecting configuration data in form of broadcasted SI data, establish a wireless communication link 1 with the radio access node 10 and communicate the collected configuration data to the radio access node 10 over the established communication link 1. If the reader 21 is implemented in the form of a NeoReader, the above-mentioned computer program may further comprise computer program code, which when run in the processor 23 of the UE 20, causes the UE 20 to read the optical representation of data associated with the radio access node 10.

The management or O&M server 30 is, as is well known to a person skilled in the art, used to provide radio access nodes 10 with additional input that is useable to enable normal operation of the radio access node. In prior art the radio access node was sometimes pre-configured with the address to the O&M server 30 such that the access node 10 during start up connected to the O&M server 30 to get configuration data. There are several drawbacks with this approached. Firstly the radio access node has to be pre-configured which increases the administrative burden of the vendor or operator as discussed above. Secondly, all configuration data must be pre-stored in the O & M server 30 which requires large administrative resources both for collecting the configuration data and to input it in the O & M server 30. In context of some embodiments of the present invention the O & M server 30 is used for configuration data that is common for all radio access nodes 10 such as program updates etc. Configuration data that is dependent on the location of the radio access node 10 will according to some embodiments of the present invention be collected by the UE 20.

The communications network 40 depicted in FIG. 1 may be complying with any or a combination of UMTS, Code Division Multiple Access 2000, CDMA2000, LTE, GSM, WLAN etc, which all are well known techniques to a person skilled in the art and therefore not described any more.

Figure 3:
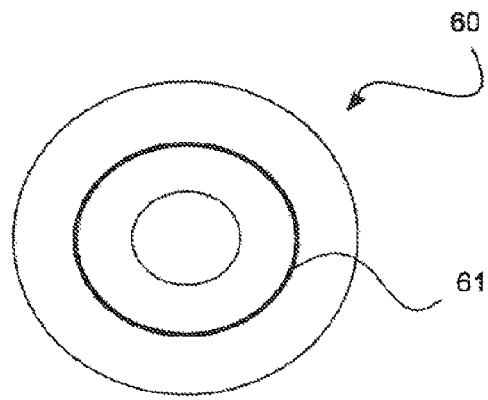
FIG. 3 schematically shows one example of a computer program product comprising computer readable means.

FIG. 3 schematically shows one example of a computer program product 60 comprising computer readable means 61. On this computer readable means 61, a computer program can be stored, which computer program, when run on the processor 23 of the UE 20, can cause the UE 20 to execute the methods according to various embodiments described in the present disclosure for collecting configuration data useable for initialization of radio access nodes 10. In this example, the computer program product is an optical disc, such as a Compact Disc, CD, a Digital Versatile Disc, DVD, or a blue-ray. The computer-readable means can also be solid state memory, such as flash memory or a software package (also sometimes referred to as software application, application or APP) distributed over a network, such as the Internet.

Figure 4:
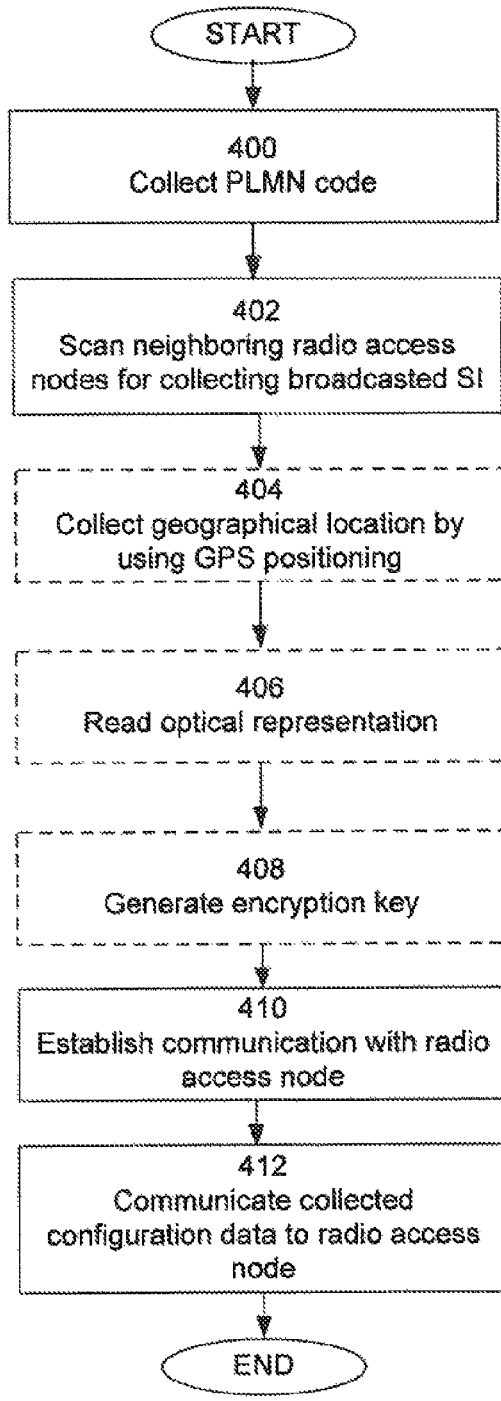
FIG. 4 is a flow chart illustrating a method performed by a user equipment according to an embodiment of the present invention.

FIG. 4 is a flow chart illustrating a method performed by the UE user equipment according to an embodiment of the present invention. A software package has been installed in the UE 20 and is stored in the memory 24 of the UE 20. The software package may also be referred to as a software application, application or APP. The software package may be downloaded to the UE 20 via a communications network 40, such as the Internet or installed in any other suitable way in the UE 20, as is well known to a person skilled in the art. When the software package is executed in the processor 23 of the UE 20, the UE 20 starts the method for collecting configuration data useable for initialization of the radio access node 10. In a first step 400 of the method the UE 20 collects configuration data in form of the PLMN code. The PLMN is a network that is established and operated by an administration or by a recognized operating agency for the specific purpose of providing land mobile telecommunications services to the public. The PLMN code may comprise the Mobile Country Code, MCC and the Mobile Network Code, MNC. Each operator that provides mobile services has its own PLMN code, which uniquely identifies the operator. Thus, once the PLMN code has been provided to a radio access node 10, the radio access node 10 will know the operator to which it belongs. There are many different ways the PLMN code may be collected by the UE 20. One alternative is that the PLMN code is loaded together with the installation of the software package mentioned above. Another alternative is to retrieve the PLMN code by reading the PLMN code from the Subscription Identity Module/Universal subscription Identity Module, SIM/USIM, of the user equipment 20. Thus, one collects the PLMN code already in use by the UE 20 itself. For example, if a certain mobile operator is to install radio access nodes 10, the personnel performing the installation process generally have a UE 20 with a subscription belonging to this particular mobile operator. That is, the SIM/USIM card or the like that is associated with the mobile operator in question. In other words, the UE 20 belonging to the personnel is already operating using the correct PLMN code. This way, the UE 20, or alternatively the software package, can retrieve the PLMN information directly from the UE 20.

In the next step 402 of the method the UE 20 is scanning neighboring radio access nodes 10 associated with the collected PLMN code for collecting configuration data in form of broadcasted SI data. The SI data may for example include information about the surrounding cellular network with the same PLMN code as the radio access node 10 that is going to be initialized. Such information may be the Cell Global Identity, CGI, the Tracking Area, TA, the routing area, the location area, the cell identity, etc. depending on which radio access technology that is used.

In a step 404, which is optional, of the method configuration data in form of geographical location data may be collected. For example, the UE 20 may be equipped with a location collector, e.g. a GPS unit, for collecting location data of the UE 20. Typically, the UE 20 and the radio access node 10 are located in close proximity to each other and, consequently, the location or position of the UE 20 is a coarse indication of the location or position of the radio access node 10. The location data may be used to simplify the connection of the radio access node 10 to a proper management system, such as the O & M server or the RNC and to automatically associate a geographical position with the radio access node.

In another optional step 406 an optical representation of data associated with the radio access node 10 to be initiated is read, the optical representation being a unique identifier of the radio access node 10. In some embodiments, the optical representation of data may be a barcode, which is for example attached to a surface, typically a wall surface, of the radio access node 10. To this end, the UE 20 may, as mentioned above, be equipped with a reader 21, e.g. a barcode reader, operable to read the optical representation of data from the radio access node 10.

Once the optical representation of data has been read by the UE 20, the UE 20 obtains a string of characters, e.g. a serial number of the radio access node 10, based on the read optical representation of data. Since the optical representation of data, e.g. a barcode, of the radio access node 10 is unique to the radio access node 10, the obtained string of characters is also unique to the radio access node 10.

Based on the obtained string of characters, the UE 20 generates an encryption key. In some embodiments, the string of characters is used as an input to an algorithm especially arranged for generating, in step 408, the encryption key.

In step 410 a wireless communication link 1 is established between the UE 20 and the radio access node 10. In preferred embodiments of the present invention the wireless communication link may be an encrypted wireless link 1. Such a communication link is typically, but not necessarily, a WLAN communication link. When WLAN connectivity has been established, the UE 20 may initiate IP (Internet Protocol) connectivity with the radio access node 10 according to, e.g., IPv4 (Internet Protocol Version 4) or IPv6 (Internet Protocol Version 4) which protocols are known in the art and will therefore not be further explained here. Communicating with the radio access node 10 over the encrypted wireless communication link 1, using the formed, or created, encryption key, for example based on the serial number of the radio access node 10 can allow for enhanced security. This way, it can be possible to safeguard against a malicious user from accessing the radio access node 10 via the wireless communication link 1.

Once the communication link 1 has been established between the UE 20 and the radio access node and all the configuration data has been collected by the UE 20, as specified in or by the installed software package that is executed in the processor 23 of the UE 20, the UE 20 will start communicating, in step 412, the collected configuration data to the radio access node 10. Thus, after this step the UE 20 has done its part in assisting the initialization of the radio access node 10.

Thus, the method for collecting configuration data useable for initialization of radio access nodes, as performed in the UE 20, has now been described in detail. As will be understood by a person skilled in the art, this method will evidently reduce the administrative burden when initialization new radio access nodes 10. This method do not, as in prior art, require personnel that is technically qualified. On the contrary by using the methods according to different embodiments of the present invention it would be possible to use for example a cab driver to initialize the radio access nodes. Since no pre-configuration of the radio access nodes is necessary it is easy for the cab driver to "grab" any radio access node from a specific vendor and bring it out to the site where it is to be initialized. Finding the site in question will probably be the most difficult task in the whole process for the cab driver. On site the cab driver starts the software package or APP that previously has been installed on his UE. The APP will as described above collect configuration data and send it to the radio access node together with the unique identifier of the radio access node. The unique identifier may be collected by using the UE 20 to read a barcode provided on the radio access node as mentioned above. When all configuration data has been collected the cab driver gets an alert and may now turn on or power up the radio access node. The UE will establish communication with the radio access node in order to communicate its configuration data to the radio access node. Thus all the cab driver has to do in order to initialize the radio access node is to bring the radio access node to the right site, start an APP in his or her UE and thereafter push the power on button of the radio access node. All the necessary configuration data is automatically collected by the UE. In conclusion, various embodiments of the invention allow for a very simplified process for the personnel when initializing a new radio access node, yet in a secure manner. As is understood the initialization may be performed by any non-skilled person and not only by the cab driver as mentioned in the example above.

The inventors of the various embodiments of this invention have realized that the embodiments of the present invention may be especially interesting in future communication networks, such as in heterogeneous network. Currently, mobile-broadband traffic is increasing. In parallel, new consumer trends are raising expectations for higher data rates in both the uplink and the downlink. Creating a heterogeneous network by introducing low power nodes is an attractive approach to meeting these traffic demands and performance expectations. This trend suggests that there will be a high number of low power nodes in the future. Due to the expected higher number of nodes that will need to be initialized, the deployment and related configurations of such nodes should preferably be as simple as possible. Since the various embodiments of the present invention allow for a simplified, yet secure, initialization of nodes, it is believed that the various embodiments of the invention will become an attractive solution for initializing new nodes in the future, e.g. nodes to be deployed in the future heterogeneous networks.

Although the present invention has been described above with reference to specific embodiments, it is not intended to be limited to the specific form set forth herein. Rather, the invention is limited only by the accompanying claims and, other embodiments than specified above are equally possible within the scope of the appended claims. In the claims, the term "comprise/comprises" does not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Reference signs in the claims are provided merely as a clarifying example and should not be construed as limiting the scope of the claims in any way.

The invention claimed is:

1. A method for collecting configuration data usable for initialization of a radio access node, the method being performed in a user equipment, in which a software package is installed and executable in a processor thereof, said method comprising:
    collecting, by the user equipment, configuration data in the form of a Public Land Mobile Network, PLMN, code;
    scanning, by the processor on the user equipment, neighboring radio access nodes associated with the collected PLMN code for collecting configuration data in the form of broadcasted System Information, SI, data;
    reading, by a reader on the user equipment, an optical representation of data associated with the radio access node, the optical representation of data being an identifier of the radio access node;
    establishing, by the processor on the user equipment, a wireless communication link with the radio access node; and
    communicating, by the user equipment, the collected configuration data to the radio access node over the established wireless communication link.

2. The method according to claim 1, wherein the SI data comprises cell identities or Cell Global Identities, CGI, used within a coverage area of the radio access node to be initialized.

3. The method according to claim 1, wherein the SI data comprises routing and/or tracking area data within a coverage area of the radio access node to be initialized.

4. The method according to claim 1, wherein the PLMN code is collected by reading the PLMN code from a Subscription Identity Module/Universal Subscription Identity Module, SIM/USIM, of the user equipment.

5. The method according to claim 1, further comprising collecting, by the user equipment, configuration data in the form of geographical location data associated with the user equipment by using a Global Positioning System, GPS.

6. The method according to claim 1, further comprising obtaining, by the processor on the user equipment, a string of characters based on the read optical representation of data associated with the radio access node and generating an encryption key based on the obtained string of characters.

7. A user equipment for collecting configuration data usable for initialization of a radio access node, the user equipment comprising:
a communication interface arranged for wireless communication;
a processor;
a reader arranged to read an optical representation of data associated with the radio access node, the optical representation being an identifier of the radio access node; and
a memory storing a software package comprising a computer program code which, when runs in the processor, causes the user equipment to:
collect configuration data in the form of a Public Land Mobile Network, PLMN, code;
scan neighboring radio access nodes associated with the collected PLMN code for collecting configuration data in the form of broadcasted System Information, SI, data;
establish a wireless communication link with the radio access node; and
communicate the collected configuration data to the radio access node over the established wireless communication link.

8. The user equipment according to claim 7, wherein the SI data comprises cell identities or Cell Global Identities, CGI, used within a coverage area of the radio access node to be initialized.

9. The user equipment according to claim 7, wherein the SI data comprises routing and/or tracking area data within a coverage area of the radio access node to be initialized.

10. The user equipment according to claim 7, wherein the user equipment is configured to collect the PLMN code by reading the PLMN code on its Subscription Identity Module/Universal Subscription Identity Module, SIM/USIM.

11. The user equipment according to claim 7, wherein the user equipment is configured to collect geographical location data associated with the user equipment by using a Global Positioning System, GPS.

12. The user equipment according to claim 7, wherein the reader is a barcode reader for reading a barcode associated with the radio access node.

13. The user equipment according to claim 7, wherein the user equipment is a smart phone, mobile phone or cellular phone.

14. A non-transitory computer-readable medium having stored thereon a computer program for collecting configuration data with a user equipment, said configuration data being usable for initialization of a radio access node, the computer program comprising computer program code which, when run in a processor of the user equipment, causes the user equipment to perform the following steps:
collect configuration data in form of a Public Land Mobile Network, PLMN, code;
scan neighboring radio access nodes associated with the collected PLMN code for collecting configuration data in the form of broadcasted System Information, SI, data;
read an optical representation of data associated with the radio access node, the optical representation of data being an identifier of the radio access node;
establish a wireless communication link with the radio access node; and
communicate the collected configuration data to the radio access node over the established wireless communication link.

15. The non-transitory computer readable medium according to claim 14, which further causes the user equipment to perform the method according to claim 2.

* * * * *